United States Patent
Gibson et al.

(10) Patent No.: US 9,432,452 B2
(45) Date of Patent: Aug. 30, 2016

(54) SYSTEMS AND METHODS FOR DYNAMIC NETWORKED PEER-TO-PEER CONTENT DISTRIBUTION

(71) Applicants: William James Gibson, Apex, NC (US); Juan Royston Benito, Raleigh, NC (US); Jason Philip Henry Bradicich, Apex, NC (US)

(72) Inventors: William James Gibson, Apex, NC (US); Juan Royston Benito, Raleigh, NC (US); Jason Philip Henry Bradicich, Apex, NC (US)

(73) Assignee: Joosy, Inc., Raleigh, NC (US)

( * ) Notice: Subject to any disclaimer, the term of this patent is extended or adjusted under 35 U.S.C. 154(b) by 196 days.

(21) Appl. No.: 14/023,172

(22) Filed: Sep. 10, 2013

(65) Prior Publication Data

US 2014/0074991 A1    Mar. 13, 2014

Related U.S. Application Data

(60) Provisional application No. 61/699,083, filed on Sep. 10, 2012.

(51) Int. Cl.
*G06F 15/16* (2006.01)
*H04L 29/08* (2006.01)

(52) U.S. Cl.
CPC ............ *H04L 67/104* (2013.01); *H04L 67/06* (2013.01); *H04L 67/1021* (2013.01); *H04L 67/1074* (2013.01); *H04L 67/1044* (2013.01)

(58) Field of Classification Search
CPC . H04L 67/104; H04L 67/1074; H04L 67/06; H04L 67/1044
USPC ....................................................... 709/219
See application file for complete search history.

(56) References Cited

U.S. PATENT DOCUMENTS

| | | | |
|---|---|---|---|
| 6,857,012 B2 | 2/2005 | Sim et al. | |
| 7,149,797 B1 * | 12/2006 | Weller | G06Q 40/04 370/254 |
| 7,512,943 B2 | 3/2009 | Hester et al. | |
| 7,567,987 B2 | 7/2009 | Shapell et al. | |
| 7,594,030 B2 | 9/2009 | Teodosiu et al. | |
| 7,603,464 B2 | 10/2009 | White et al. | |
| 7,672,235 B1 * | 3/2010 | Lian et al. | 370/230 |
| 7,903,652 B2 | 3/2011 | Huang et al. | |
| 8,073,978 B2 * | 12/2011 | Sengupta | G06F 17/30864 370/401 |
| 8,122,098 B1 | 2/2012 | Richardson et al. | |
| 8,166,154 B2 | 4/2012 | Choi | |
| 2004/0246921 A1 | 12/2004 | Bates et al. | |
| 2004/0249888 A1 | 12/2004 | Berkey et al. | |
| 2005/0216473 A1 * | 9/2005 | Aoyagi et al. | 707/10 |
| 2006/0031537 A1 | 2/2006 | Boutboul et al. | |
| 2006/0265401 A1 | 11/2006 | Edmond et al. | |
| 2007/0214207 A1 * | 9/2007 | Xie et al. | 709/201 |
| 2008/0189617 A1 | 8/2008 | Covell et al. | |
| 2008/0273541 A1 * | 11/2008 | Pharn | 370/400 |
| 2009/0055461 A1 | 2/2009 | Georgis et al. | |
| 2009/0083390 A1 * | 3/2009 | Abu-Ghazaleh et al. | 709/209 |
| 2010/0070570 A1 | 3/2010 | Lepeska | |
| 2010/0198992 A1 | 8/2010 | Morrison et al. | |
| 2011/0128889 A1 * | 6/2011 | Liao et al. | 370/255 |
| 2011/0271275 A1 * | 11/2011 | Ochi et al. | 717/177 |
| 2012/0102535 A1 | 4/2012 | Weintraub et al. | |
| 2012/0191778 A1 | 7/2012 | Kim et al. | |
| 2012/0221646 A1 | 8/2012 | Ciminiera et al. | |
| 2012/0221647 A1 | 8/2012 | Ciminiera et al. | |

* cited by examiner

*Primary Examiner* — Viet Vu
*Assistant Examiner* — Herman Belcher
(74) *Attorney, Agent, or Firm* — Triangle Patents, PLLC

(57) ABSTRACT

Peer-to-peer (P2P) dynamic networks and/or sub-networks for file distribution between peers receiving the same content, wherein nodes are outside controlled networks and/or content distribution networks (CDNs), and wherein large data files are distributed or shared across and among the peer nodes.

15 Claims, 14 Drawing Sheets

SYSTEMS AND METHODS FOR DYNAMIC NETWORKED PEER-TO-PEER CONTENT DISTRIBUTION

CROSS REFERENCE TO RELATED APPLICATIONS

This application claims the benefit of U.S. Provisional Application No. 61/699,083, filed Sep. 10, 2012.

BACKGROUND OF THE INVENTION

1. Field of the Invention

The present invention relates to peer-to-peer network content distribution.

2. Description of the Prior Art

Generally, it is known in the relevant prior art to provide peer-to-peer (P2P) networks via the internet for sharing digital content, including video, for live streaming service over content distribution networks (CDNs). By way of example, relevant documents include the following:

U.S. Patent Pub. No. 20120221646 by Ciminiera, et al. for "Caching of Digital Contents in P2P Networks," filed Nov. 13, 2009, describing a method for enabling sharing of content files among nodes of a P2P network, comprising sub-networks each including a respective plurality of nodes capable of storing content files.

U.S. Patent Pub. No. 20040249888 by Berkey, et al. for "Command and control of arbitrary resources in a peer-to-peer network," filed May 12, 2004, disclosing a method and apparatus for virtualizing access to resources in a distributed peer-to-peer (P2P) network.

U.S. Patent Pub. No. 20120191778 by Kim, et al. for "Content Distribution Network for Supporting Peer-to-Peer Live Streaming," filed Jan. 28, 2011, describing a method and system for providing a Peer-to-Peer (P2P) live streaming service over a Content Distribution Network (CDN).

U.S. Patent Pub. No. 20120102535 by Weintraub, et al. for "Content Storage and Delivery System and Associated Method and Device," filed Nov. 9, 2011, disclosing a system for the storage of content on a network and the delivery of content to subscriber locations. Content is delivered over a packet-switching network according to a peer to peer file distribution protocol.

U.S. Patent Pub. No. 20100070570 by Lepeska for "Dedicated Shared Byte Cache," filed Sep. 10, 2009, relates to methods, apparatus, and systems for providing peer-to-peer network acceleration.

U.S. Patent Pub. No. 20080189617 by Covell, et al. for "Distributed Video Content Management and Sharing System," filed Jan. 22, 2008, describing a system which enables cooperative rich media content management, sharing, and publishing across a distributed set of websites, web servers, and media servers based on control information in an online database.

U.S. Patent Pub. No. 20060265401 by Edmond, et al. for "Grid Network for Distribution of Files," filed May 19, 2006, disclosing a system including first server nodes having authentication functions coupled to a network, wherein the system also includes second server nodes having repositories of complete files also coupled to the network, and still further includes a set of client nodes having local repositories for files coupled to the network.

U.S. Patent Pub. No. 20040246921 by Bates, et al. for "Method and System for persisting content in a decentralized network," filed May 27, 2004, describing methods to ensure that content defining a sub-grid of a decentralized network continues to be provided to the sub-grid upon departure of a node from the sub-grid that has been responsible for providing the content.

U.S. Patent Pub. No. 20060031537 by Boutboul, et al. for "Method, system, and program product for optimized concurrent data download with a grid computing environment," filed Jun. 8, 2004, teaching a grid computer system having a plurality of download servers in network communication with client computers and a download management system, a client requests a download plan from the download management system for downloading data in parallel from the plurality of download servers to a client.

U.S. Patent Pub. No. 20120221647 by Ciminera, et al. for "Sharing of Digital Contents in P2P Networks Exploiting Localization Data," filed Nov. 3, 2009, disclosing a method for enabling sharing of content files among nodes of a P2P network is provided. The P2P network comprises sub-networks each including a respective plurality of nodes capable of storing content files.

U.S. Patent Pub. No. 20100198992 by Morrison, et al. for "Synchronization of audio and video signals from remote sources over the internet," filed Apr. 8, 2010, describing an architecture and technology for a method for synchronizing multiple streams of time-based digital audio and video content from separate and distinct remote sources, so that when the streams are joined, they are perceived to be in unison.

U.S. Patent Pub. No. 20090055461 by Georgis, et al. for "System and method for effectively optimizing content segment downloads in an electronic network," filed Aug. 23, 2007, disclosing a system and method for optimizing content distribution in an electronic network includes a peer-to-peer network of client devices; also, including an optimization module from a tracking server iteratively redistributes said content segments among the client devices to seek an optimal content segment configuration of said content segments for optimizing performance characteristics of content reassembly procedures.

U.S. Pat. No. 7,903,652 by Huang, et al. for "System and method for peer to peer video streaming," filed Dec. 14, 2006, teaching, in an Internet Protocol Television (IPTV) system, an IPTV server is configured to receive a request from an IPTV content storage device (CSD) to view a video stream. The IPTV server selects a set of peers for the IPTV CSD, and transmits the set of peers to the IPTV CSD.

U.S. Pat. No. 7,512,943 by Hester, et al. for "Distributed caching of files in a network," filed Aug. 30, 2005, disclosing distributed caching and download of a filing, including a method for building a peer list comprising a listing of potential peer servers from among one or more networked computers.

U.S. Pat. No. 7,567,987 by Shappell, et al. for "File Sharing in P2P group shared spaces," filed Oct. 24, 2003, describing a computer implemented method and system enable users to share files in a server-less shared space, by providing access to such spaces via a visual presentation, the system renders content available for access by other group members.

U.S. Pat. No. 7,594,030 by Teodosiu, et al. for "Locator and tracing service for peer to peer resource," filed Sep. 13, 2001, including a resource naming service (RNS) server receives peer resource request from peer platforms through a networking environment.

U.S. Pat. No. 8,122,098 by Richardson, et al. for "Managing content delivery network service providers by a content broker," filed Nov. 17, 2008, describing a system, method, and computer readable medium for managing network storage provider and CDN service providers are provided.

U.S. Pat. No. 6,857,012 by Sim et al. for "Method and apparatus for initializing a new node in a network," filed May 18, 2001, teaching a method for initializing a new node in a network. The network has multiple nodes arranged in a virtual tree format.

U.S. Pat. No. 7,603,464 by White, et al. for "Method and system for identifying available resources in a peer-to-peer network," filed May 27, 2004, disclosing a method for a peer of a peer-to-peer network to search for an available resource is provided, including a peer-to-peer grid and system for publishing and identifying an available resource in a peer-to-peer distributed network are also provided.

U.S. Pat. No. 8,166,154 by Choi for "Method for streaming multimedia content," filed Aug. 13, 2005, describing streaming multimedia content from a content server to client, user multimedia devices (UMDs) connected to the content server through a network includes the steps of monitoring storage states, of UMDs connected to the network, for present multimedia content, and automatically transmitting a starting block of the content to any UMD not yet storing the block; also, tasks preparatory to streaming are advantageously offloaded to the client side and distributed among UMDs, to realize reduced bandwidth and delay and to conserve on storage capacity of a UMD.

U.S. Pat. No. 8,117,306 by Baumback, et al. for "Optimizing content management," filed Sep. 29, 2008, teaching a system and method for monitoring the performance associated with fulfilling resource requests and determining optimizations for improving such performance are provided, including the use of a CDN/CDN service provider.

The prior art fails to provide video streaming over P2P networks outside the structure and control of CDNs.

SUMMARY OF THE INVENTION

The present invention relates to peer-to-peer (P2P) dynamic networks and/or sub-networks, wherein nodes are outside controlled networks and/or content distribution networks (CDNs), and wherein large data files are distributed or shared across and among the peer nodes. Furthermore, the peers are only those that are consuming the same content, i.e., the P2P connection is because of the content commonality.

It is an object of this invention to provide P2P dynamic networks and/or sub-networks for file distribution between peers receiving the same content. Accordingly, a broad embodiment of this invention is directed to, by way of example, embodiments of the present invention include dynamic networks base upon a trace route, e.g., CDN internet protocol (IP) addresses.

Another object of the present invention is to provide dynamic P2P networks for distribution of large data file(s) to recipient peer nodes, wherein the dynamic P2P networks are outside a static network of controlled systems.

Still another object of the present invention is to provide dynamic P2P networks for real-time or near-real-time distribution of digital content to a multiplicity of peer nodes within the network, wherein the peer nodes are established and/or defined based upon their consumption of the same content, i.e., the peer nodes are receiving the same content.

These and other objects and aspects of the present invention will become apparent to those skilled in the art after a reading of the following description of the preferred embodiment when considered with the drawings, as they support the claimed invention.

DETAILED DESCRIPTION OF THE INVENTION

Figure 1:
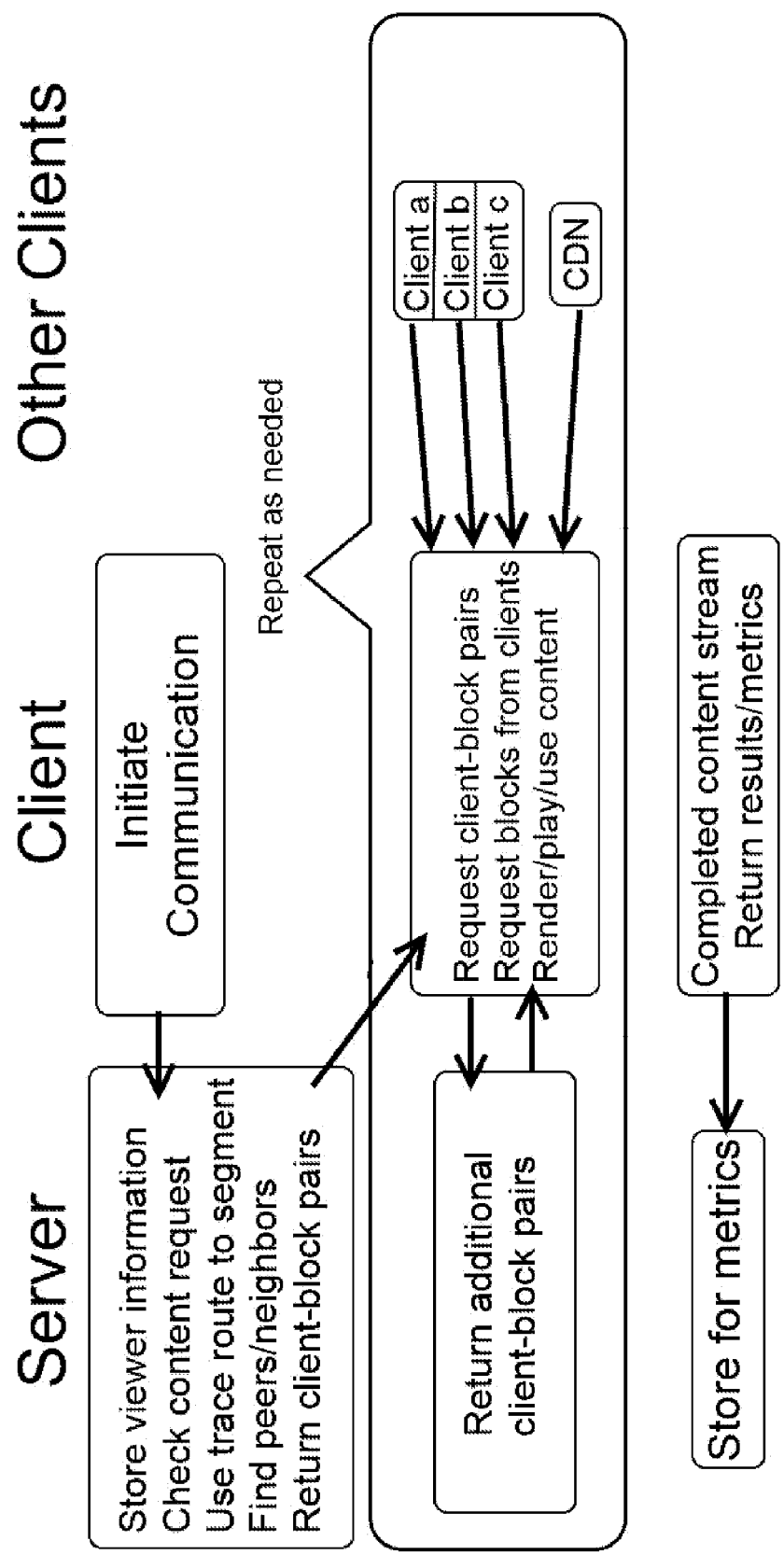
FIG. 1 is a schematic diagram of one embodiment of the invention.

Referring now to the drawings in general, the illustrations are for the purpose of describing a preferred embodiment of the invention and are not intended to limit the invention thereto.

The present invention provides systems and methods for peer-to-peer (P2P) dynamic networks and/or sub-networks for file distribution between peers receiving the same content. Accordingly, a broad embodiment of this invention is directed to, by way of example, embodiments of the present invention include dynamic networks based upon a trace route or other dynamic network segmentation strategy, e.g., content delivery networks (CDN) internet protocol (IP) address. In particular, any instance of large data file distribution to recipient peer nodes is considered within the scope of the present invention, including but not limited to video file distribution, game content distribution, large data files, and combinations thereof. Any packet and/or stream of data that is ordered correctly and delivered in a timely way is considered the content for distribution within the P2P dynamic networks and/or sub-networks of the present invention.

By way of contrast to prior art content delivery networks, the systems and methods of the present invention, which include virtualized computing networks and content delivery origination server(s) for dynamic network-based P2P content distribution, provide more efficient and reduced cost of delivery for the content, as well as optionally providing live streaming for video and/or audio content as well as data, files, analytics, and combinations thereof. The content recipients have a peerness established and/or defined by the common content they are receiving from the CDN server; the systems and methods automatically identify peer nodes receiving common content and create dynamic network communication connection for the peer nodes to transmit that common content to each other, rather than the content being directed from the CDN server directly to each recipient node.

Systems and methods of the present invention provide for content delivery to a multiplicity of peer nodes within P2P dynamic networks and/or sub-networks, wherein the file distribution occurs between peers receiving the same content. Accordingly, a broad embodiment of this invention is directed to, by way of example, embodiments of the present invention include dynamic networks base upon at least one trace route, e.g., CDN internet protocol (IP) addresses. Preferably, the present invention does not require any naming outside the IP addresses for peer nodes.

Preferably, the systems and methods of the present invention provide for dynamic P2P networks distributing digital content in real-time or near-real-time to a multiplicity of peer nodes within the network, wherein the peer nodes are established and/or defined based upon their consumption of the same content, i.e., the peer nodes are receiving the same content.

It will be appreciated by one of ordinary skill in the art that the embodiments of the present invention described herein assume the use of existing audio and/or video playback. Advantageously, this corresponds to systems and methods for P2P content distribution among peers of a dynamic network or sub-network without requiring new compression or playback for efficient distribution. Furthermore, the content distributed via the peer nodes of the present invention does not establish the "peerness" or the P2P connections is not physical location-dependent, control-dependent, or ownership-dependent; in other words, the peerness of peer nodes of the present invention are established by the commonality of the content consumed therebetween. The P2P distribution of content according to the systems and methods of the present invention provide for cached content at each peer node; there is no stored content among the peer nodes.

Beneficially, the present invention systems and methods provide increased reliability, more redundancy, and more efficient delivery than those of the prior art. A content delivery server originates distribution of at least one predetermined piece of content over dynamic network(s) and/or sub-network(s) as illustrated in the figures. The content delivery server of the present invention identifies the peer nodes for at least one piece of content; those peer nodes having content in common are identified and used for the distribution within that dynamic network; new peer nodes are added for common content with other peer nodes. Peer nodes or content recipients of the same content provide for redirected content delivery among peer nodes (or users), thereby by-passing any established or static content delivery network (CDN); advantageously, this saves time, improves redundancy, and also reduces or eliminates costs for content delivery over the CDN for the peer nodes. The content delivery server further identifies those peer nodes that are in close network proximity to each other and uses them to distribute content to each other to create more efficient content delivery thereby.

Factors for balancing or managing distribution of the P2P content delivery over dynamic networks associated with the present invention include segmentation based on CDN address resolution, trace route to CDN and the P2P server manager, dynamic feedback from peers reporting traffic rates between individual peer and its neighbors, round-robin, other server side scheduling/resource allocation techniques, and combinations thereof. Management of peer distribution is preferably centrally managed, although some level of management may be offloaded to client peers.

In one embodiment of the present invention, the systems and methods of the present invention may be integrated with applications (Apps) for mobile devices, including but not limited to smart phones, tablet computers, mobile computers, mobile communication devices, and the like, and combinations thereof. However, no customized or proprietary software download to the peer node content recipient devices is required for the systems and methods of the present invention. By way of example, existing technologies and/or software that may be used to download peer node content include either Adobe Flash or a combination of W3C standards WebRTC and MediaSource, along with modern web browsers like WebKit, Google Chrome, Apple Safari, Mozilla, and/or MS IE. The present invention dynamic networking of peer nodes easily integrates with existing websites and Apps that provide for content distribution and/or delivery over the Internet or other CDN. Furthermore, by contrast to the prior art, there is no unique content delivery network registration required for peer node operation and dynamic network content distribution according to the present invention.

Figure 11:
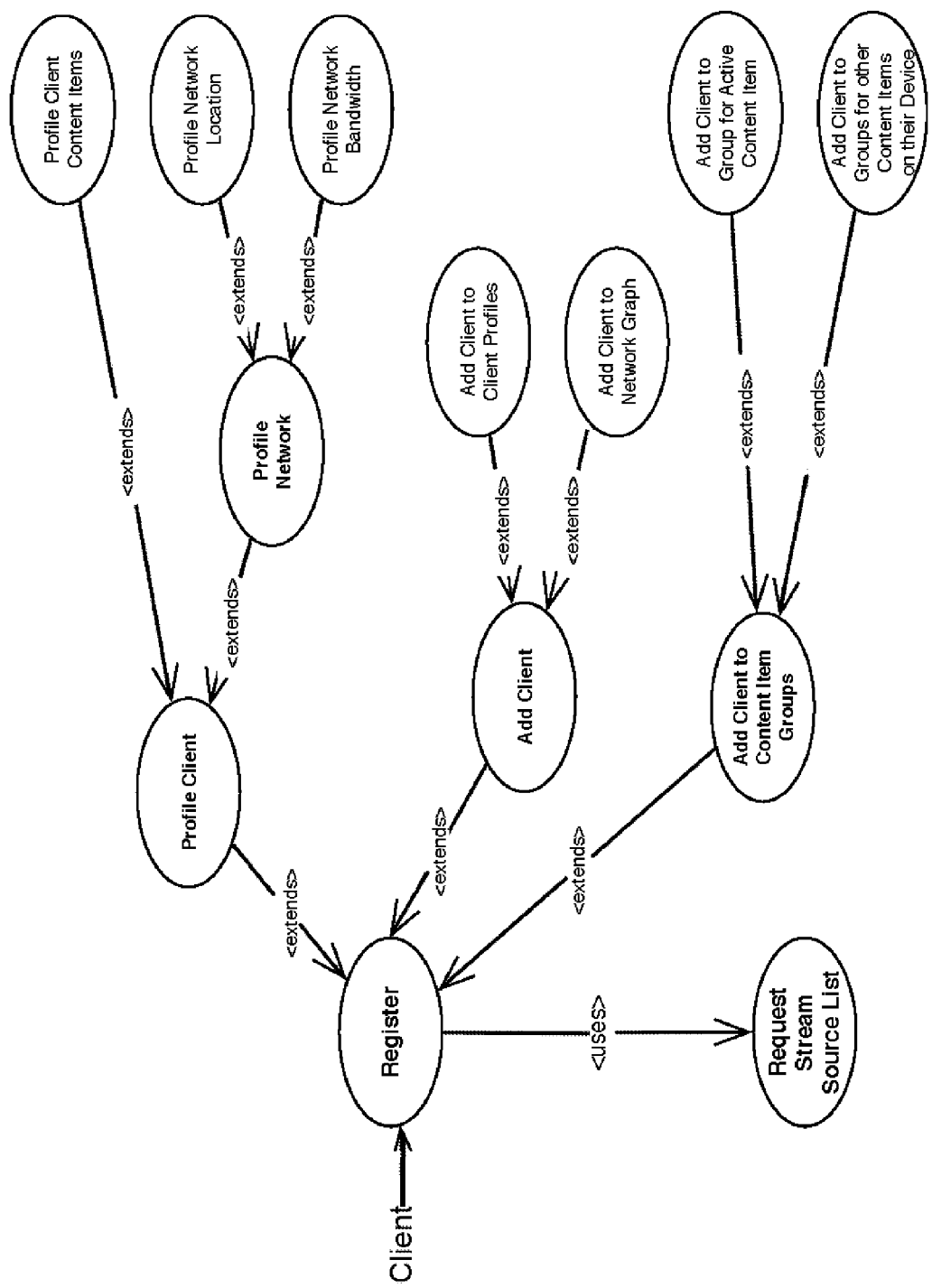
FIG. 11 is a schematic diagram of the invention illustrating use cases for a registration function.

In another embodiment of the present invention, by way of example and not limitation, streaming video is provided by at least one content server constructed and configured in remote physical location or remote network distance from a multiplicity of peer node content recipient devices, all of which are configured in network-based communication with each other, over at least one network and/or sub-network. While proximity of physical location is important, it is primarily the network proximity or network distance that is also used to determine the dynamic P2P networks among peer nodes, based upon the network routing required. Groups are preferably within the same subnetwork of an internet service provider (ISP) for the nodes. Also, load balancing is a factor considered in determining the dynamic P2P networks. A content delivery network where the video content originates includes a series of servers; preferably, the closest network distance to those is included in the dynamic P2P networks. By way of example and not limitation, a routing table including IP addresses of the source of the video content provides a grouping mechanism and a sorting mechanism to provide at least one grouping of peer nodes having the common content. This is illustrated in FIG. 11 for the Register function, at the step of adding client to content item group.

The at least one content server originates at least one content piece for distribution over the network(s) and/or sub-network(s) to the peer nodes and their corresponding content recipient devices, wherein the peer nodes are connected in dynamic network-based (IP-based) communication for receiving and sharing the same content with each other, wherein the peerness of the peer nodes that initiates their cross-communication is based upon common content that each is receiving from the server(s).

Also, the systems and methods of the present invention, in particular as illustrated in the figures, and more particularly in FIGS. 11-14, include implementation for dynamic peer-to-peer (P2P) network-based, IP-based communication among peer nodes, wherein the peerness of the peer nodes is defined by their common content. In one embodiment of the present invention, the dynamic P2P networks are scalable to provide for a single dynamic P2P network among peer nodes, so long as all peer nodes have common content. Preferably, the dynamic P2P networks include small groups of peer nodes, between about five to about 100 peer nodes, all having common content. More preferably, the dynamic P2P networks include small groups of peer nodes, between about five (5) and about twenty (20) peer nodes all having common content. And more preferably still, the dynamic P2P networks include small groups of peer nodes, between about eight (8) and about ten (10) peer nodes having common content defining their peerness. The number of peer nodes determines the number of common connections, which is affected by the IP protocol being used; thus, a single "hop" is preferred over "leapfogging" among the peer nodes. If there are too many peer nodes the repeat is slowed, and switching among processors and servers is costly. Also, if the groups are too small, e.g., two (2) peer nodes, there may be some disconnectivity; this problem is solved by at least about five (5) peer nodes because the multiplicity of peer nodes having common content provides connections that may not be available between each of the peer nodes directly. The minimum number of peer nodes in any group forming a dynamic P2P network having common content sharing is determined by the number required for reliability; the maximum number is determined by the number that provides for the common content sharing to be managed and to maintain connection for communication of the common content for simultaneous viewing by the users associated with the peer nodes. Methods of the present invention include a step of determining grouping of clients having common content based upon a variety of metrics including CDN IP (routing table), QoS, ISP ID, and subnet id. The automatic determination of group size for the P2P dynamic networks according to the present invention is important for performance and ability to manage issues to a single or multiplicity of clients in the group but balanced by a need to reduce system resources needed to keep connections to all group members. Also, the methods of the present invention further include the step of the system dynamically reassigning clients to other groups, for example as needed for reasons like dissolution of a group due to loss/lowering of group member count, splitting a group that grew too large, and QoS metrics dictated different grouping.

Significantly, the present invention common content is most preferably a video content that is common among the peer nodes. By way of contrast to prior art, which may include video games being played simultaneously by remote users, or audio content, which is typically not simultaneous common content, the video common content is at least 10 times larger or even 100 times larger, and so the small groups of peer nodes forming the dynamic P2P networks of the present invention provide for smooth playback and avoids stuttering problems or delays or buffering problems. The volume of video content that is common among the peer nodes at the time of viewing creates a critical factor of timeliness for the content sharing among the peer nodes having common content at the same time, for providing peer node coordination and cooperation. The common content that defines the peerness of the peer nodes within a dynamic P2P network for video sharing includes common content and common temporality of the common content. The need for peer nodes to share in real-time or near-real-time all while the users are viewing the video content via the remote, distributed peer nodes provides a session constraint that does not exist with prior art gaming or prior art audio sharing, which most commonly is shared offline, not during concurrent use by the peer nodes users. Thus, for video, the common content that defines the peer nodes and their peerness for creating the dynamic P2P network is the same video. By way of example and not limitation, a television show, an instructional video, any entertainment video provided over the web, such as by YouTube, NetFlix, or any streaming video broadcast or on-demand are included within the present invention. The common content is the moving video stream with coordinated audio, which defines the peerness and is used to determine the dynamic P2P network among those peer nodes with the common content.

FIG. 1 is a schematic diagram of one embodiment of the invention.

In one embodiment of the invention, a server database includes content information (e.g., URL, listing of encodings, customer), metrics (e.g., content, connection history, performance, trends, miss count/CDN requests, client/CDN addresses), and active viewers/sessions (e.g., content; viewer info-system, address, . . . ; routing—CDN addresses, route trace, grouping; blocks available and requested; service information and history).

Figure 2:
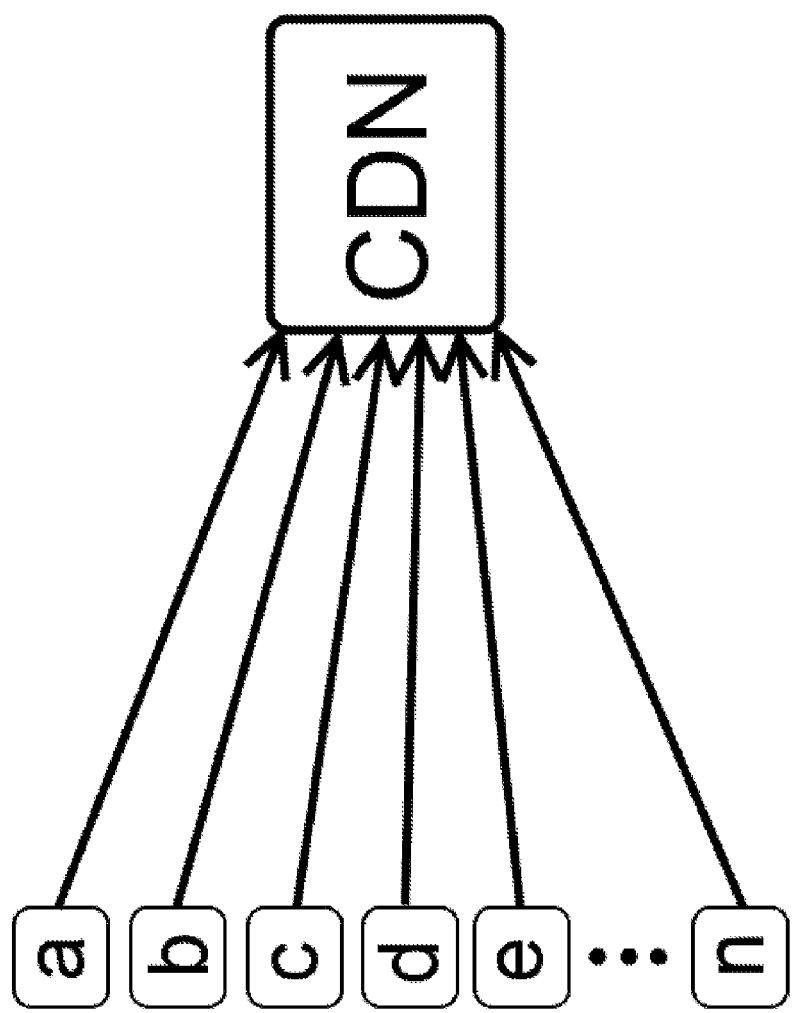
FIGS. 2-9 are schematic diagrams of additional embodiments of the invention.
Figure 3:
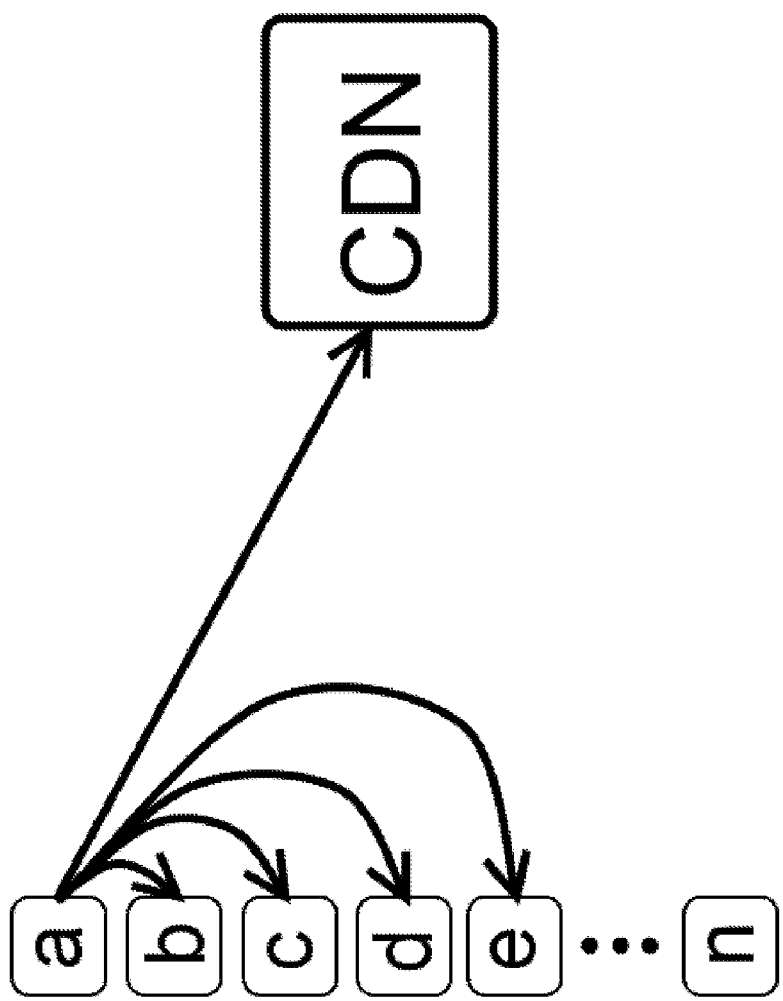
Figure 4:
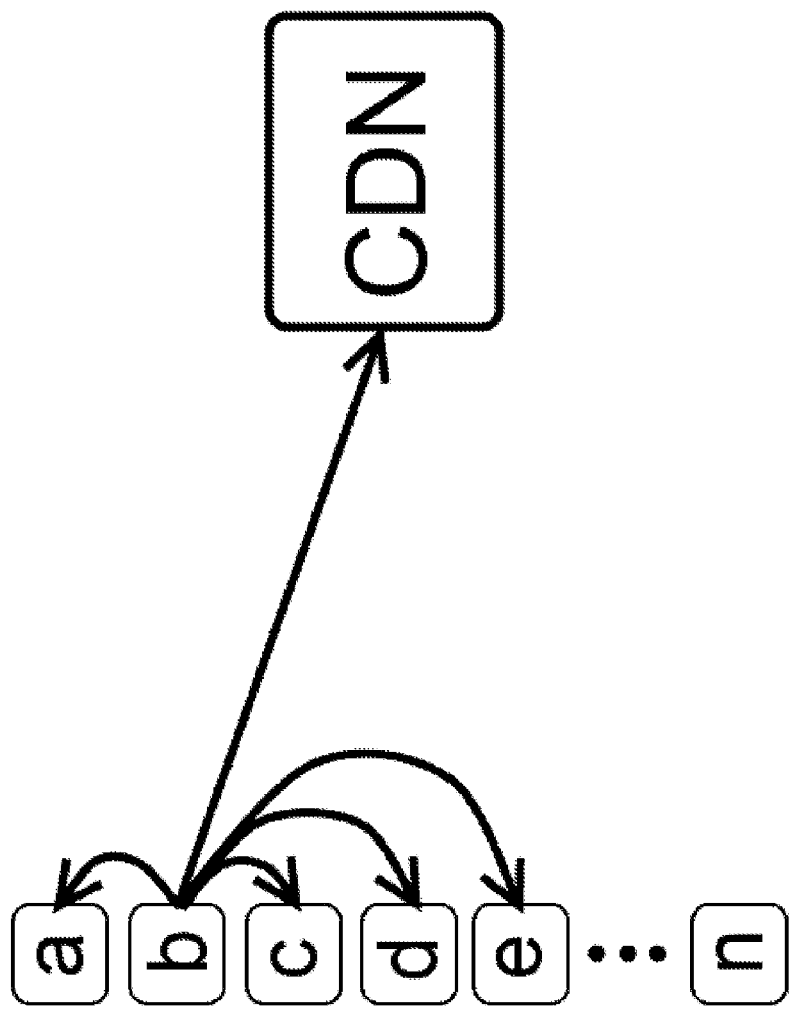
Figure 5:
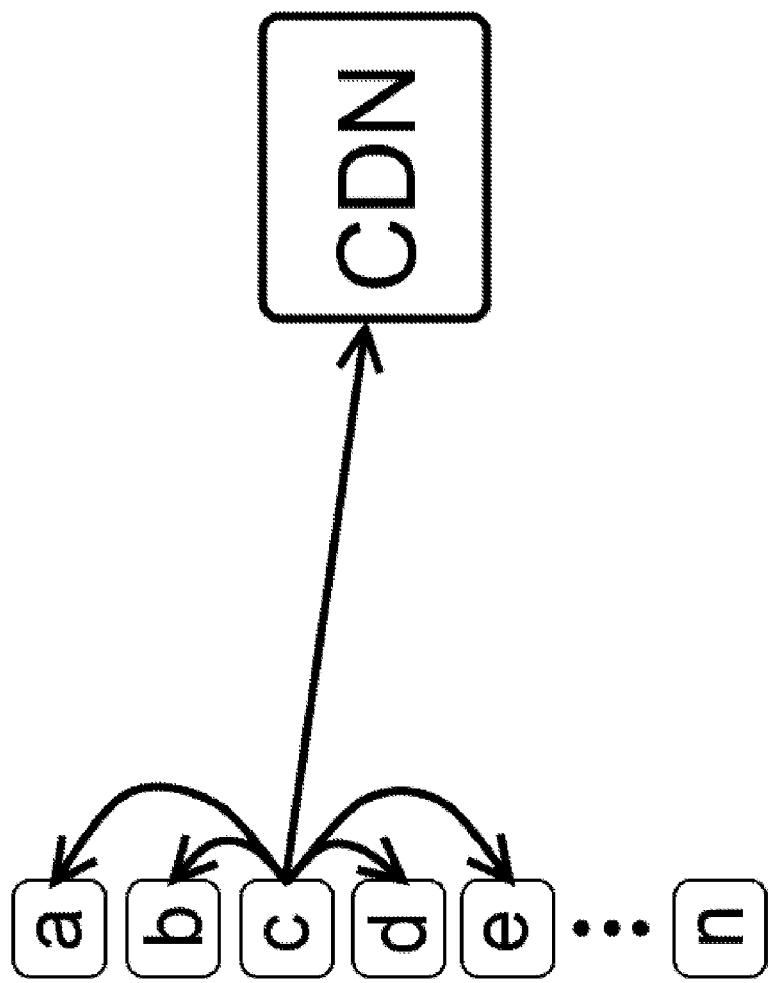
Figure 6:
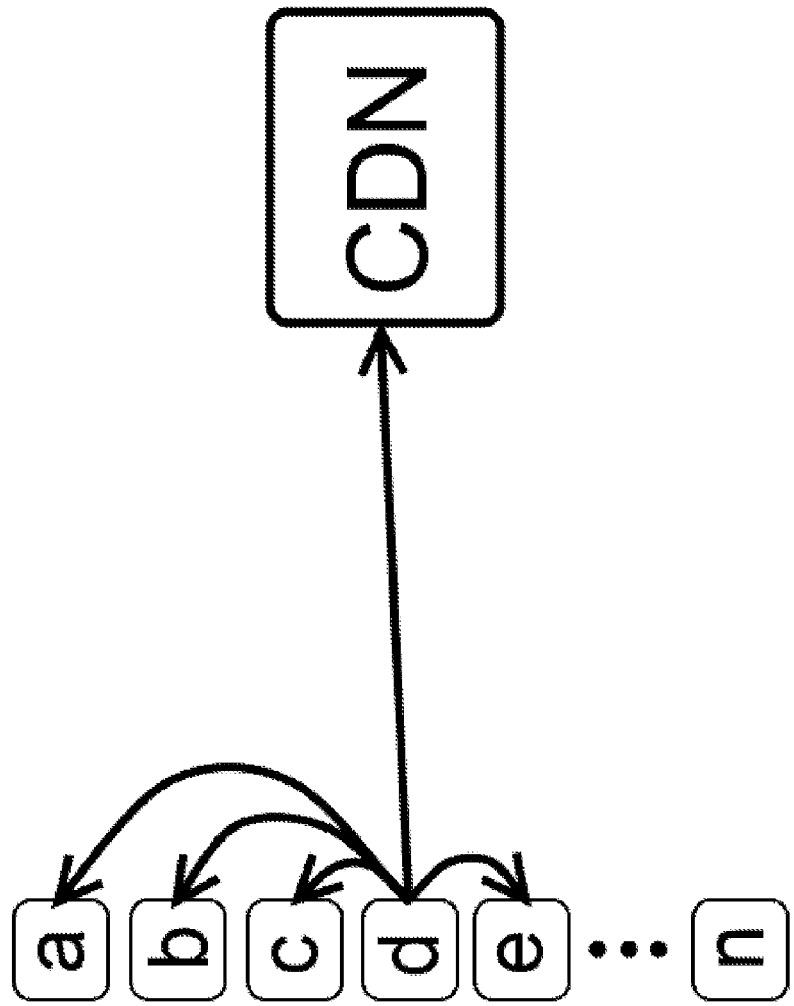
Figure 7:
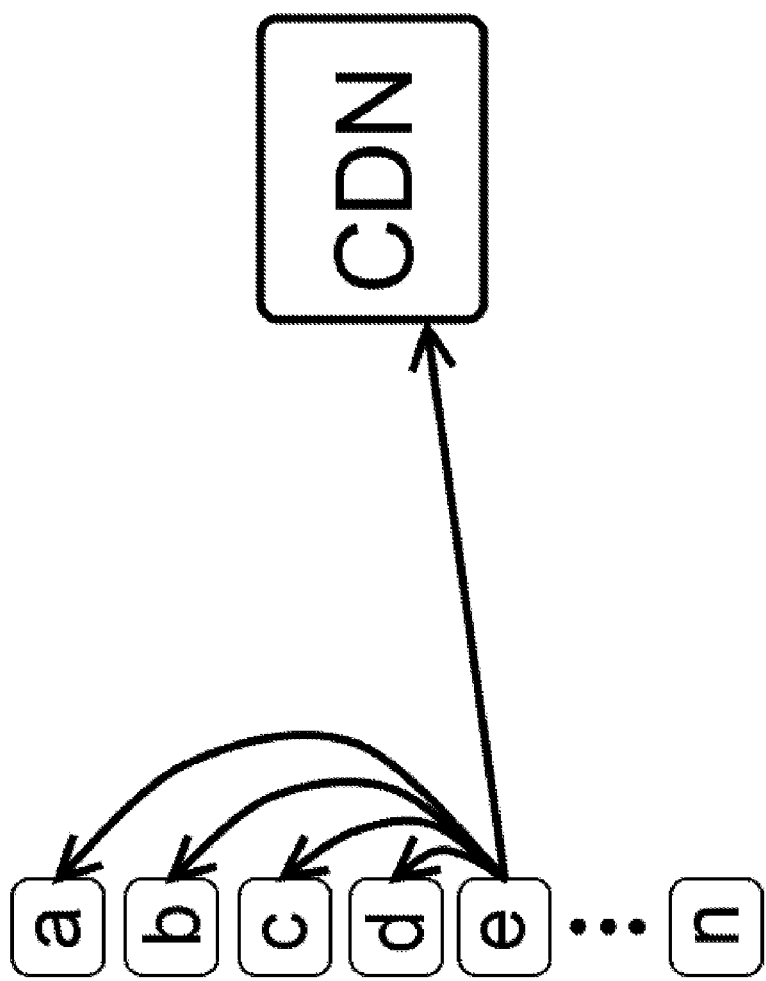
Figure 8:
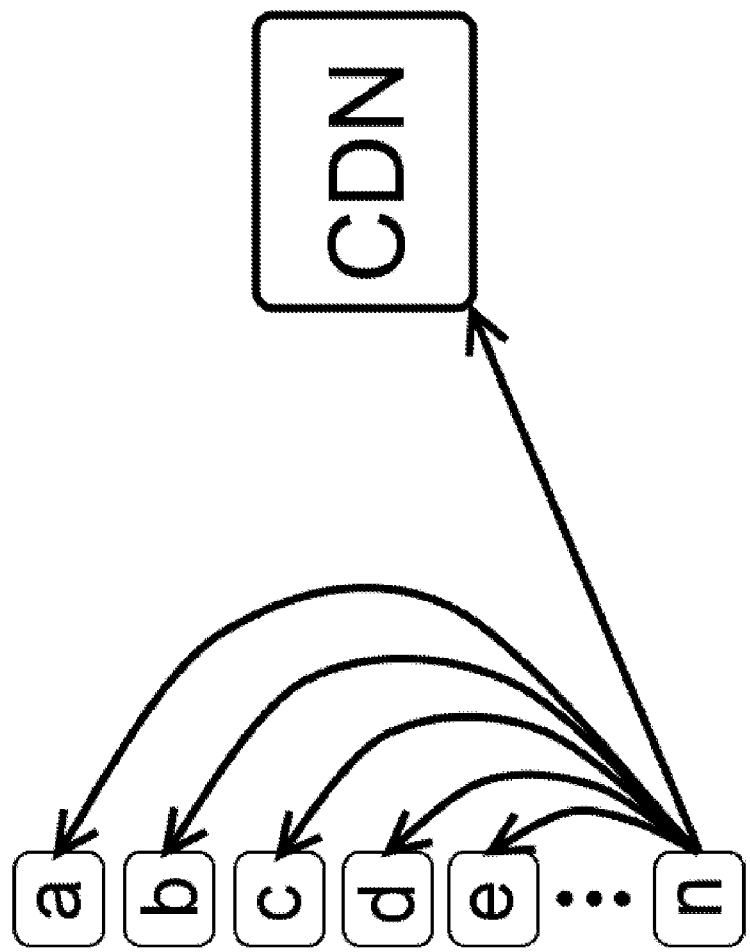
Figure 9:
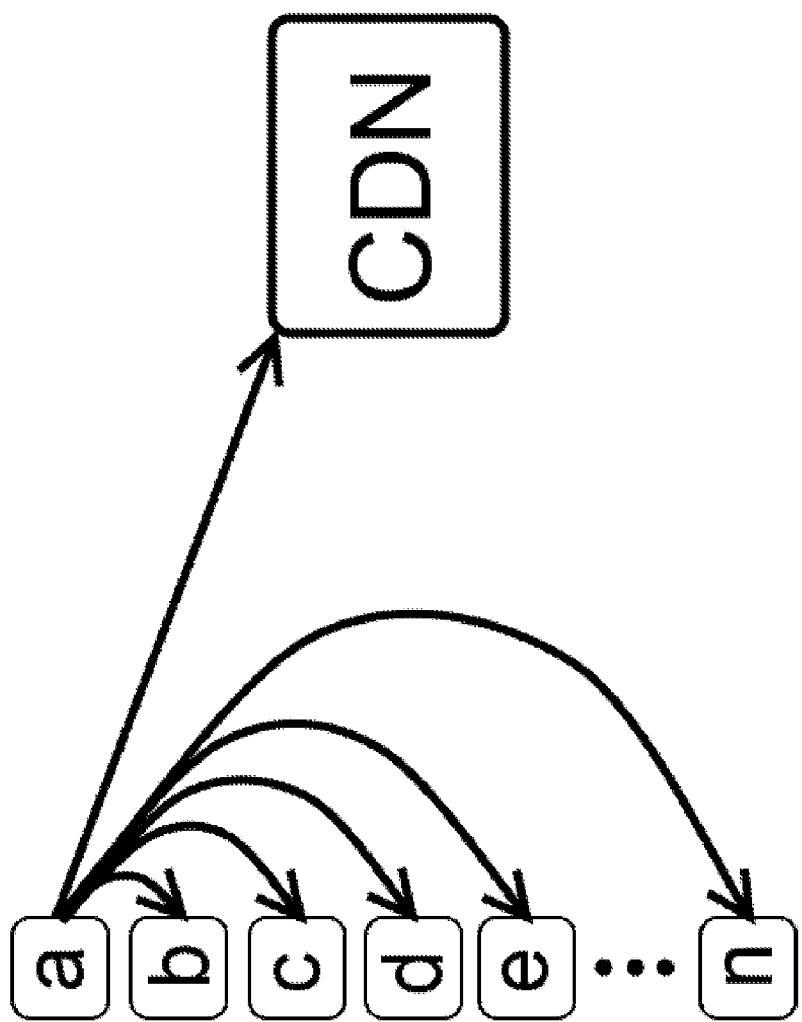

FIGS. 2-9 are schematic diagrams of additional embodiments of the invention. In these figures, embodiments of live streaming synchronized viewing processes are represented. Content playback is slightly delayed, like normal streaming, and the streaming media is broken up into smaller segments. Segments are downloaded as needed—preference is to obtain from other viewers (a, b, c, d, e . . . n) but will default to CDN if needed. Viewers are grouped by network "closeness." Downloading of content looks like "leap-frog" or bicycling peloton. In FIG. 2, the server directs viewers to pre-fetch an initial segment. In FIG. 3, viewer a: segment 1 (CDN), segment 2 (viewer b), segment 3 (viewer c), segment 4 (viewer d), segment 5 (viewer e). In FIG. 4, viewer b: segment 1 (viewer a), segment 2 (CDN), segment 3 (viewer c), segment 4 (viewer d), segment 5 (viewer e). In FIG. 5, viewer c: segment 1 (viewer a), segment 2 (viewer b), segment 3 (CDN), segment 4 (viewer d), segment 5 (viewer e). In FIG. 6, viewer d: segment 1 (viewer a), segment 2 (viewer b), segment 3 (viewer c), segment 4 (CDN), segment 5 (viewer e). In FIG. 7, viewer e: segment 1 (viewer a), segment 2 (viewer b), segment 3 (viewer c), segment 4 (viewer d), segment 5 (CDN). In FIG. 8, viewer n: segment 1 (viewer a), segment 2 (viewer b), segment 3 (viewer c), segment 4 (viewer d), segment 5 (viewer e), segment n (CDN). In FIG. 9, viewer a: segment n (viewer n), segment n+1 (CDN), segment n+2 (viewer b), segment n+3 (viewer c).

Figure 10:
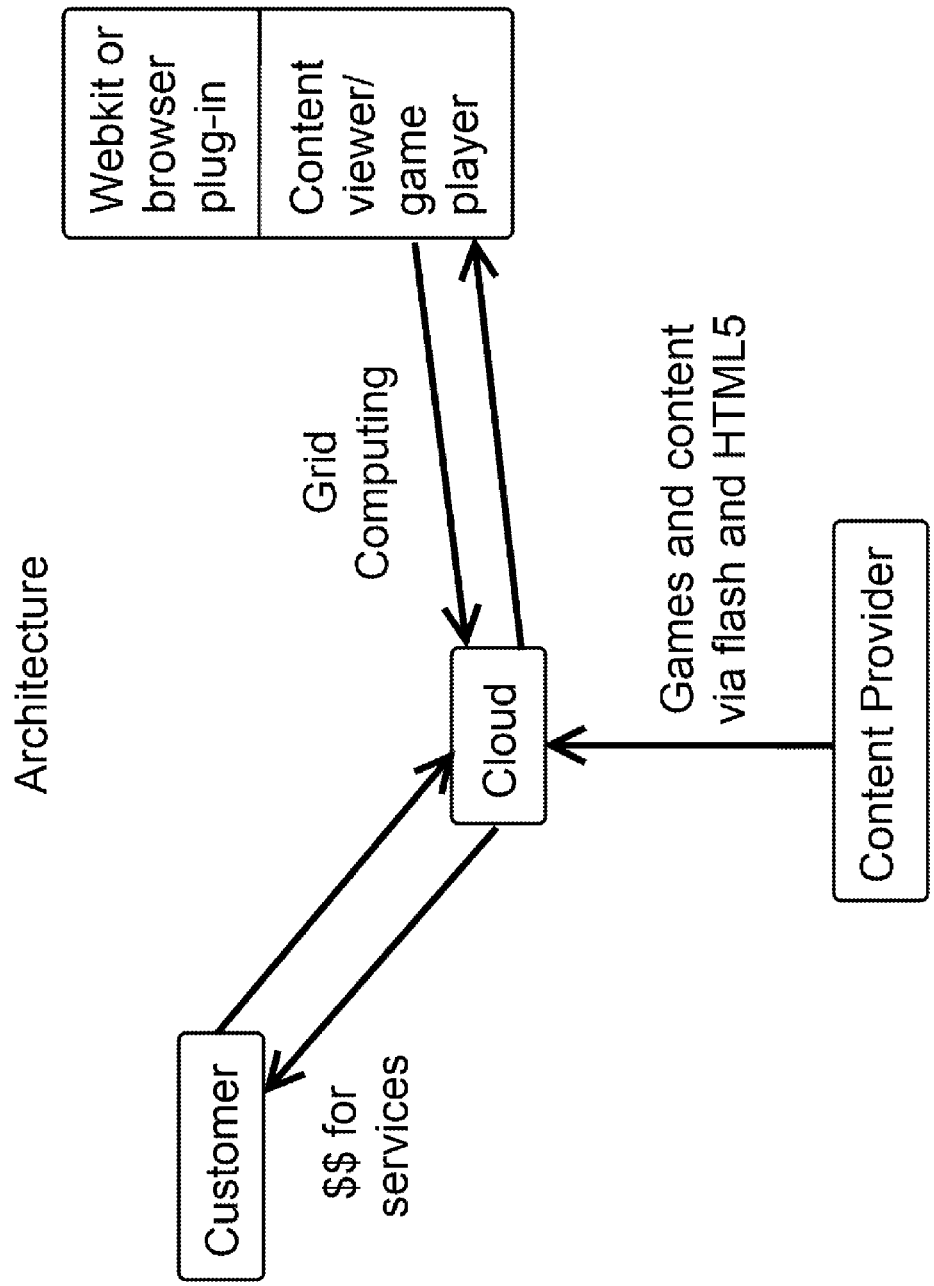
FIG. 10 is a schematic diagram of another embodiment of the invention.

FIG. 10 is a schematic diagram of another embodiment of the invention, which illustrates the business process employed with a calculation/processing cycle harvesting ecosystem. The main points are peer nodes that process calculations and are rewarded by consuming online entertainment or other content. End users of calculations pay for the results. The payment is used to defray the cost of content license, distribution, and revenue back to the dynamic CDN distribution server and/or service provider.

FIG. 11 is a schematic diagram of the invention illustrating use cases for a registration function. A client icon is illustrated at an initiation of the registration function and corresponding steps. From a register step, a profile client is provided, including profile client content items and a profile network including subcomponents of profile network location and profile network bandwith. Also from the register step, add client is provided, including add client to client profiles and another option of add client to network graph. Additionally, from the register step, add client to content item groups, further including the steps of add client to group for active content item and add client to groups for other content items on their device(s). Also, request stream source list function extends from the register function step(s).

Figure 12:
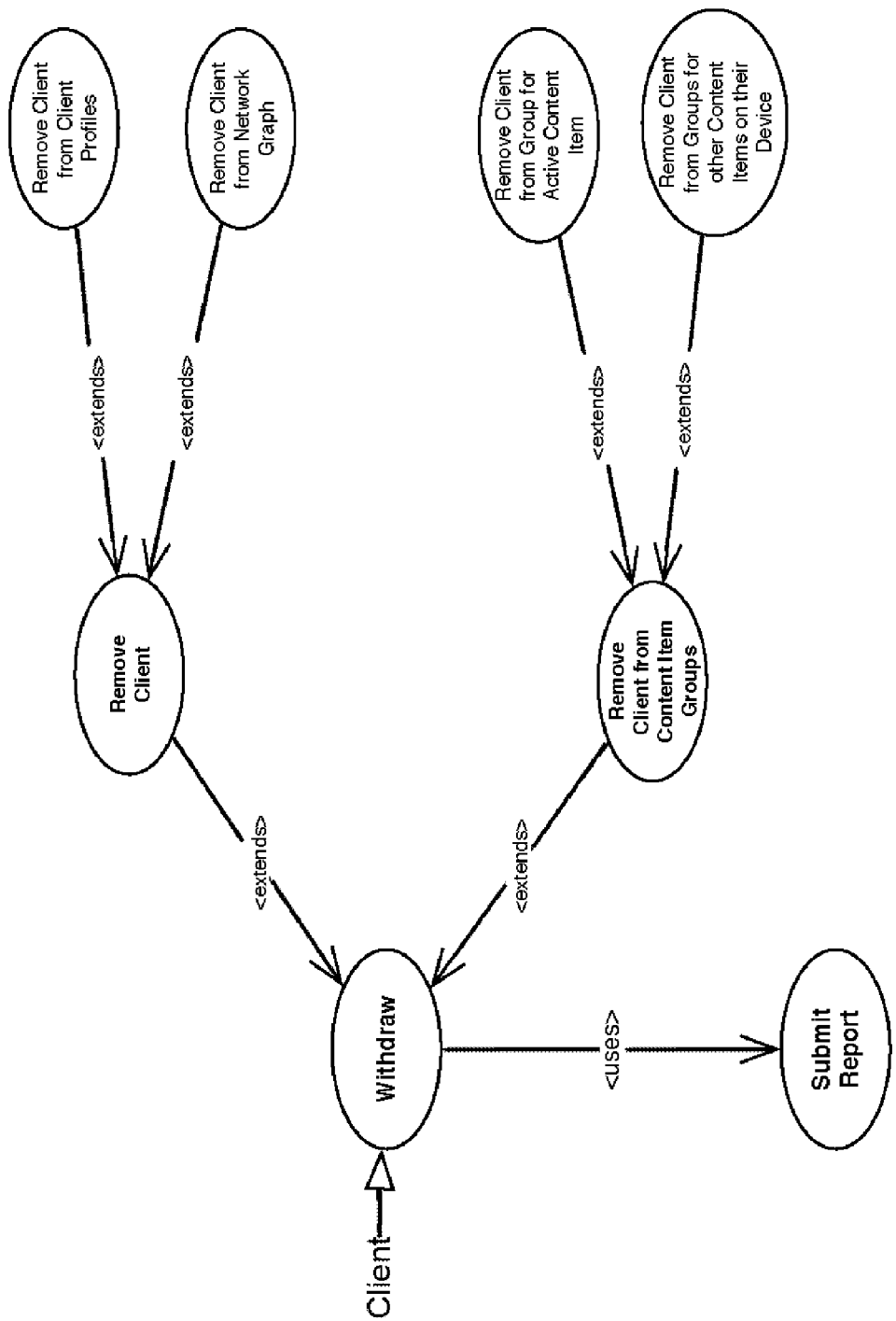
FIG. 12 is a schematic diagram of the invention illustrating use cases for a withdraw function.

FIG. 12 is a schematic diagram of the invention illustrating use cases for a withdraw function. From a withdraw step, a remove client is provided, including remove client from client profiles step and remove client from network graph, which are automatically initiated upon indication of withdraw request received by at least one server associated with the P2P networks of the present invention. Also, the steps of remove client from content item groups, which further includes the steps of remove client from group for active content item and remove client from groups for other content items on their device(s).

Figure 13:
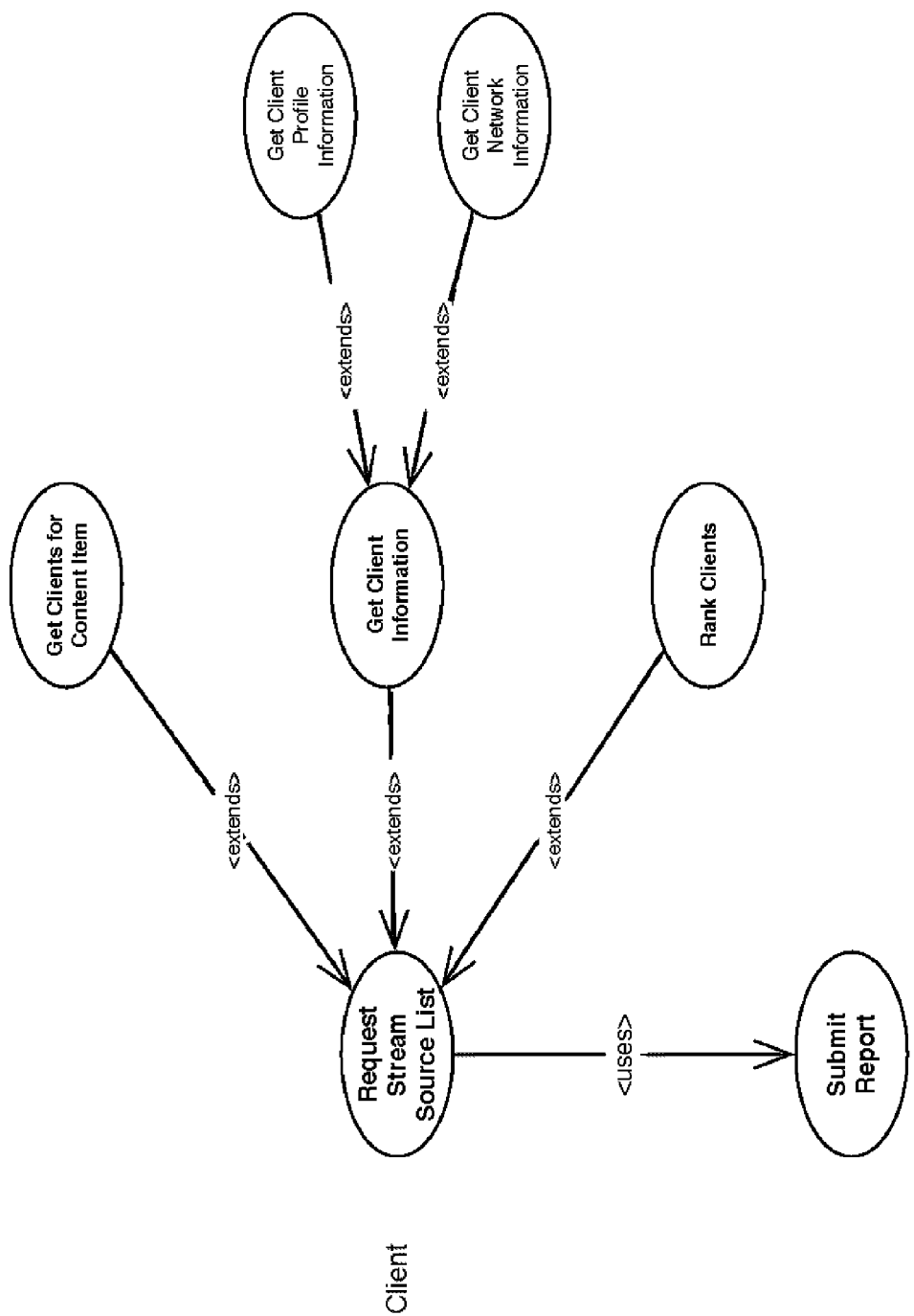
FIG. 13 is a schematic diagram of the invention illustrating use cases for a request stream source list function.

FIG. 13 is a schematic diagram of the invention illustrating use cases for a request stream source list function. From a request stream resource list step initiated by a client user, a profile client is provided, including the steps of get clients for content item, get client information, which includes other steps of get client profile information, and get client network information. Additional steps of rank clients and submit report follow.

Figure 14:
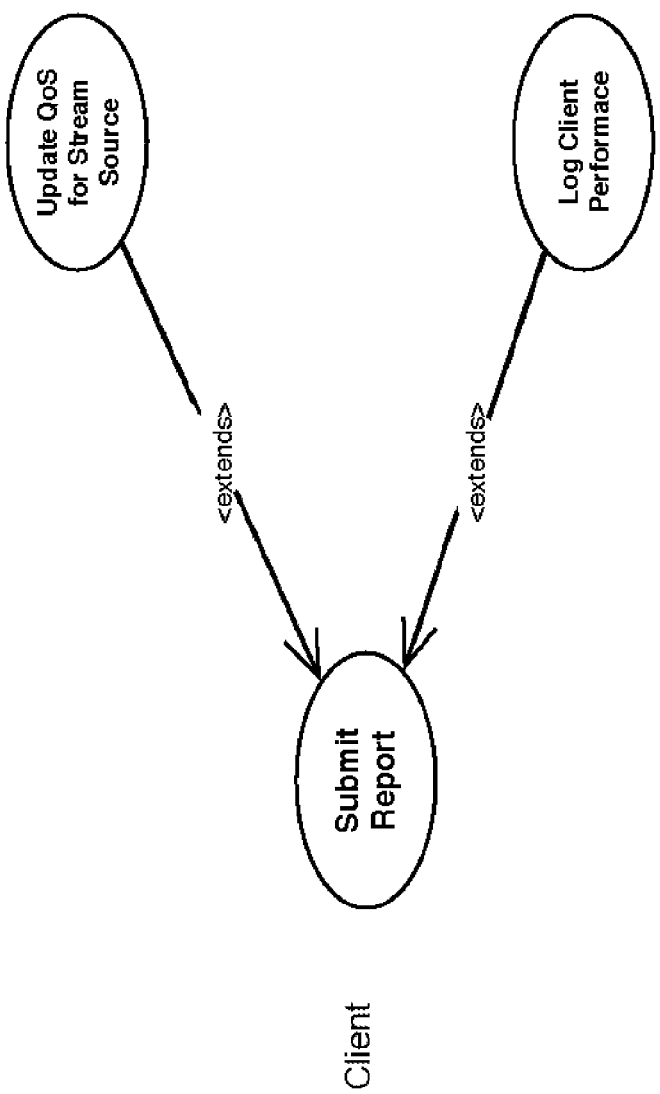
FIG. 14 is a schematic diagram of the invention illustrating use cases for a submit report function.

FIG. 14 is a schematic diagram of the invention illustrating use cases for a submit report function that further includes the steps of update QoS for stream source and log client performance.

Advertisement associated with the content shared among the peer nodes is also provided according to systems and methods of the present invention. Precisely targeted advertisement related to the common content that defines the peerness, combined with the dynamic network communication of the present invention provide for optimized relevance or matching or advertising content with intended recipients. By way of example and not limitation, community-driven advertisement is a beneficial object of the present invention systems and methods.

Gaming and social media are further considered subject to P2P dynamic network distribution content for the present invention. Gaming and social media typically have updated content (e.g., static/unchanging items like new game levels, additional content, social information like photos and video) that could be pre-distributed instead of pulled by the user removing latency and wait during game play or social network activities. Additionally, it is possible to use peer nodes for distributed storage as well as additional (game-based/social network) database processing. Also, processing may be performed over the peer nodes. Corporate content or commercial data provide another example of content provided under the systems and methods of the present invention, wherein the peer nodes are users within a common corporation, organization, or entity. Specifically, examples of corporate content or commercial data include but are not limited to training videos, company events, files, and combinations thereof.

Advantageously, another aspect of the systems and methods of the present invention provide for simulation to leverage the hardware of the peer node content recipient devices for providing coordinated analytics, for example on large data sets. The data is retained within the community or peers (i.e., peer nodes determined by peerness or commonality of data being distributed thereto and/or therebetween). Thus, the present invention provides for leveraging communities sharing common content with each other over the dynamic network(s) and/or sub-network(s) without the content being distributed directly from the CDN server originating the content, and without the content distribution being limited or otherwise restricted by the established (static) CDN network(s). The systems and methods of the present invention provide for harnessing the content recipient devices to aggregate or assemble intelligent functionality of the devices unassociated with the content receipt, including but not limited to computational storage and processing capacity of the content recipient devices in the P2P dynamic network, as in grid computing applications for massively parallel computation in addition to the P2P content distribution and redundancy of online content distribution to receiving or recipient peer node devices.

In yet another beneficial application of the systems and methods of the present invention, economically driven incentives to peer nodes or content recipients include savings, compensation, points, credits, and combinations thereof, are provided for participation by the recipient devices (peer node devices receiving the common content), i.e., to encourage, promote, incentivize, or increase the number of peers for any piece of content, thereby providing elasticity of the dynamic CDN when the demand for any particular content is highest or at high levels for periods of time. A virtual currency may thus be provided to encourage the multiplicity of peer node content recipient devices to participate within the dynamic network(s) and/or sub-network(s) for receiving more content (for example viewing more video downloads) and thereby participating in more than one of the dynamic networks due to increased frequency and type of content.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for virtualized computing peer-based content sharing comprising:
at least one content delivery server computer constructed and configured for electrical connection and communication via at least one communications network; and
at least one peer-to-peer (P2P) dynamic network including a multiplicity of peer nodes, wherein the multiplicity of peer nodes consume the same content within a predetermined time, wherein the multiplicity of peer nodes are constructed and configured for electronic communication over the at least one P2P dynamic network, wherein the at least one P2P dynamic network is based on at least one trace route; wherein the multiplicity of peer nodes is distributed outside controlled networks and/or content distribution networks (CDNs) that are included within the at least one communications network;
wherein the at least one content delivery server computer is operable to store viewer information, check content request, use the trace route to segment requested content, find peers, and return client-block pairs;
wherein distribution of P2P content delivery over the at least one P2P dynamic network is based on content segmentation;
wherein content segmentation is based on CDN address resolution, trace route to CDN and P2P server manager, dynamic feedback from peers reporting traffic rates between individual peer and its neighbors, round-robin and other server side scheduling/resource allocation techniques.

2. The system of claim 1, wherein large data files are distributed or shared across and/or among the peer nodes.

3. The system of claim 1, the P2P connection among and/or across the peer nodes is provided because of a content commonality.

4. The system of claim 1, further including sub-networks within the at least one P2P dynamic network.

5. A method for virtualized computing peer-based content sharing comprising the steps of:
providing at least one content delivery server computer constructed and configured for electrical connection and communication via at least one communications network;

providing at least one peer-to-peer (P2P) dynamic network including a multiplicity of peer nodes constructed and configured for electronic communication over the at least one P2P dynamic network, wherein the multiplicity of peer nodes consume the same content within a predetermined time, wherein the at least one P2P dynamic network is based on at least one trace route, wherein the multiplicity of peer nodes is distributed outside controlled networks and/or content distribution networks (CDNs) that are included within the at least one communications network;

the at least one content delivery server computer receiving at least one content request from a client;

the at least one content delivery server computer segmenting requested content based on CDN address resolution, trace route to CDN and the P2P server manager, dynamic feedback from peers reporting traffic rates between individual peer and its neighbors, round-robin, and other server side scheduling/resource allocation techniques;

automatically identifying at least one peer node having at least one segment of the requested content in close network proximity to the client; and at least one peer node most proximal to the client sharing the at least one segment of the requested content.

6. The method of claim 5, further including the steps of automatically registering the client; adding the client; and adding the client to content item groups.

7. The method of claim 5, further including the steps of getting client information and getting clients for the requested content item.

8. The method of claim 7, further including the step of ranking clients based upon client profile information and client network information.

9. The method of claim 8, further including the step of providing the content for the client to play or view the content.

10. The method of claim 5, further including the step of the system automatically grouping clients into groups having between about 5 and about 100 clients.

11. The method of claim 5, further including the step of the system automatically grouping clients into groups having between about 5 and about 20 clients.

12. The method of claim 5, further including the step of the system automatically grouping clients into groups having between about 8 and about 10 clients.

13. The method of claim 5, further including the step of determining grouping of clients having common content based upon a variety of metrics including CDN IP (routing table), QoS, ISP ID, and subnet id.

14. The method of claim 5, further including the step of the system dynamically reassigning clients to other groups.

15. The method of claim 5, further comprising providing economically driven incentives to peer nodes for participation in the at least one P2P dynamic network.

* * * * *